Feb. 22, 1966 R. F. KRUPP ETAL 3,236,106
COUPLING WITH SHEAR PIN
Filed Jan. 22, 1965
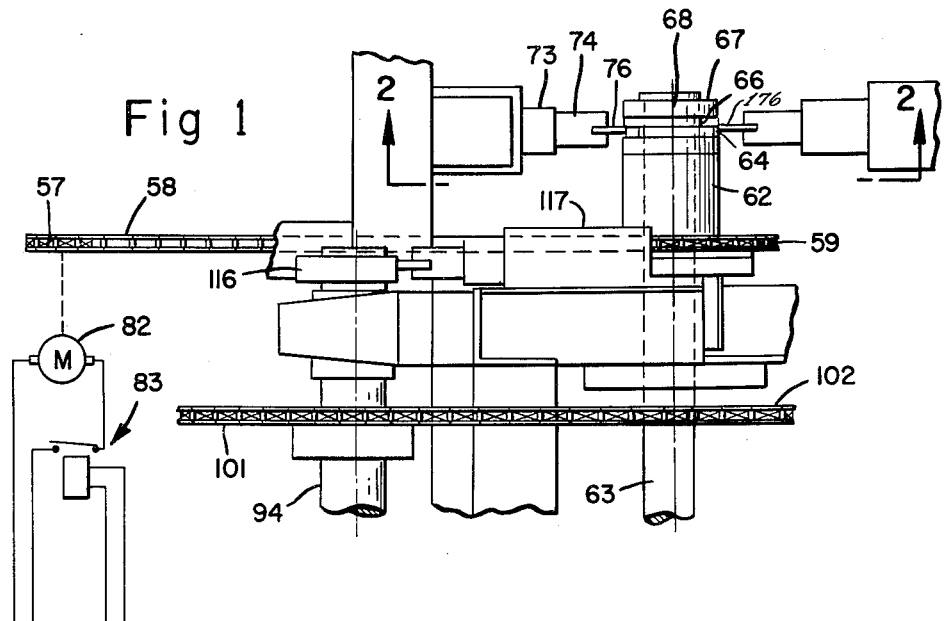
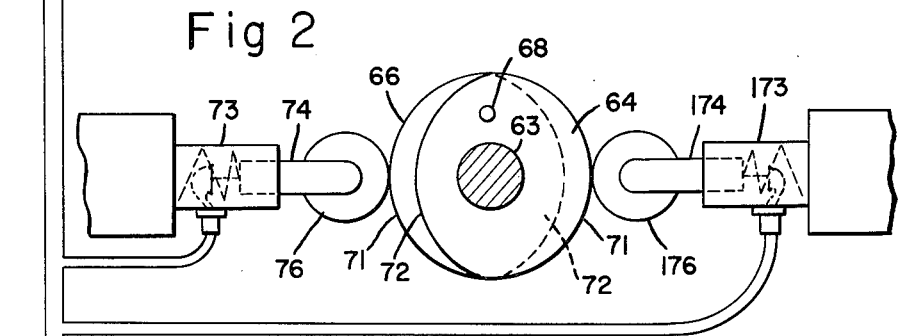
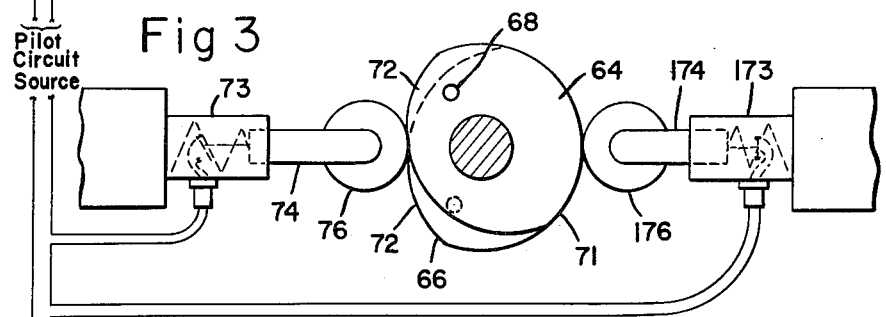
INVENTOR.
ROBERT F. KRUPP
JAN K. WAGNER
BY
*Townsend & Townsend*
ATTORNEYS

United States Patent Office 3,236,106
Patented Feb. 22, 1966

3,236,106
COUPLING WITH SHEAR PIN
Robert F. Krupp, Davis, and Jan K. Wagner, Oakland, Calif., assignors to Gerber Products Company, Fremont, Mich.
Filed Jan. 22, 1965, Ser. No. 427,372
3 Claims. (Cl. 74—2)

This invention relates to a new and improved coupling with shear pin. This application comprises a continuation-in-part of our co-pending patent application, Serial No. 238,479 and co-pending patent application, Serial No. 23,798, filed April 21, 1960, and now U.S. Patent No. 3,075,332.

This invention relates to a new and improved jar handling machine and more particularly relates to that type of machine in which cartons containing glass jars or the like are open. Reference is made to said U.S. Patent No. 3,075,332, for a description of such a machine.

A feature of the invention is provision of a cam shear coupling which has a shear pin which parts when an overload is placed on the machine. This coupling employs two cams, each having approximately 180 degrees high dwell and angularly spaced apart 180 degrees. When the shear pin is intact, two cam followers which are placed to ride on both cams always ride high because both are retracted on one or the other high dwells. However, when the shear pin breaks, the angular position of the two cams shifts so that a low dwell of one cam coincides with at least a portion of the low dwell of another cam, and this permits one or the other cam follower rollers to drop into the low dwell and operate a switch to stop the drive motor of the machine.

Other objects of the present invention will become apparent upon reading the following specification and referring to the accompanying drawings in which similar characters of references represent corresponding parts in each of the several views.

In the drawings:

FIG. 1 is a top plan view of a portion of a machine showing the shear coupling switch.

FIG. 2 is a fragmentary sectional view taken substantially along the line 2—2 of FIG. 1 showing the shear pin intact.

FIG. 3 is a view similar to FIG. 2 showing the shear pin broken.

The present invention is intended for use with a machine similar to that shown in the U.S. Patent No. 3,075,-332, it being understood that the invention may be used with other types of machines. The present invention finds application in the drive of shaft 63. An elongated transversely extending collar 62 is concentric with shaft 63, but rotatable relative thereto. On the outer end of collar 62 is a cam 64 which turns therewith. Spaced outwardly from cam 64 is a second cam 66 which is fixed to collar 67 which is in turn fixed to shaft 63. A shear pin 68 passes through cams 64 and 66; and when intact the shear pin causes collar 67, which is connected to cam 66, to rotate with collar 62, which is connected to cam 64, and thus shaft 63 is driven as sprocket 59, which is fixed to shaft 62, is rotated. Sprocket 59 is turned by roller chain 81 which in turn is suitably connected to motor 82, referred to further below. In the event that an overload occurs in the machine, the overload causes shear pin 68 to fracture and thus the normal position of cam 64 relative to cam 66 is displaced.

As best indicated in FIGS. 2 and 3, each cam 64 and 66 consists of a high dwell 71 and a low dwell 72, each having an arcuate length of approximately 180 degrees. In the normal position of the two cams—i.e., when the shear pin 68 is intact (FIG. 2), the high dwells 71 are approximately 180 degrees apart. However, when the shear pin 68 is severed, this angular relationship is disturbed as shown in FIG. 3.

Mounted adjacent cams 64 and 66 and in line therewith are micro-switches 73 and 173 each having an outwardly projecting plunger 74 and 174, respectively, which are biased outwardly by the switch mechanism itself, in the manner known in the art and as indicated in FIGS. 2 and 3, and carry on each of their outer ends a roller 76 and 176, respectively. The center of roller 76 and 176 lies on the parting plane between the two cams 64 and 66 so that the high dwell 71 of both cams contact either roller 76 or 176 as the cam assembly normally rotates. Because of the fact that the two high dwells 71 are each of approximately 180 degrees length and are displaced from each other 180 degrees, so long as shear pin 68 is intact, one or the other of the two high dwells is always in contact with either roller 76 or 176 and maintains each roller in retracted position. However, as soon as the shear pin 68 is fractured, either because of an overload on one side of the machine or the other, the low dwells 72 of the two cams coincide for at least a small arc, and when either of the cam follow rollers 76 or 176 encounters the depressed arcuate portion wherein the low dwells coincide, either plunger 74 or 174 is caused to project outwardly. Projection of the plunger 74 or 174 operates to open either switch 73 or 173, depending upon which of the two cam followers is caused to extend outwardly, which in turn operates a relay indicated at 83 which shuts off the drive motor of the machine. Thus, any tendency of the motor to overrun when the shear pin 68 breaks is overcome by reason of the fact that the motor is stopped. After the condition causing the overload is remedied, the shear pin 68 is replaced thereby restoring normal operation of the machine. In the embodiment shown herein, power may be transmitted through roller chain sprocket 102, which is secured to shaft 63, and hence to roller chain 101 to cause normal operation of the machine.

Although the foregoing invention has been described in some detail by way of illustration and example for purposes of clarity of understanding, it is understood that certain changes and modifications may be practiced within the spirit of the invention and scope of the appended claims.

What is claimed is:

1. A cam and cam follower actuating mechanism for shear pin couplings comprising, in combination: a shaft, a first cam member rotatably mounted on said shaft; a second cam member fixed to said shaft adjacent said first cam member, said first and second cam members each having a hole of equal diameter spaced out from their respective centers of rotation and capable of alignment with each other, said first cam member connected to power input and the second cam member load connected; a shear pin interconnecting said cam members, said shear pin of nearly equal diameter and residing equally in each said hole, whereby said shear pin when intact and residing in each said hole causes said first cam member and said shaft to turn together and when said shear pin is severed by said first cam member rotated in respect to said second cam member by a predetermined overload causes the first and second cam members to rotate in respect to each other; each said cam member having a high dwell of approximately 180 degrees duration and a low dwell, said high dwells being 180 degrees displaced from each other when said shear pin is intact, and in side by side relation; a first cam follower positioned radially outwardly of said shaft and with one end and lying in the plane defined by the surfaces of said cams adjacent to each other and in contact with one of said cam members, and a second cam follower positioned radially outwardly of said shaft and about 180 degrees removed from said first cam follower, said second cam follower lying in the plane defined by the surfaces of said cams adjacent to each other and having one end in contact with the other of said cam members; biasing means attached to each said cam follower to urge the cam followers to contact said cam members; each said cam follower having a retracted and projected position, the cam followers being in retracted position when contacting the high dwell of either of said cam members, said cam followers being in retracted position at all times when said shear pin is intact, and at least one of said cam followers being at least temporarily in projected position when said shear pin is severed and said cam members rotate in respect to each other to a position in which said high dwells are less than 180 degrees apart relative to each other.

2. A mechanism for shear pin couplings to interrupt rotation of the coupled elements in the event of an overload comprising: a driven shaft, a first cam member concentric with said shaft but rotatable relative to said shaft, a second cam member mounted on said shaft in proximity to said first cam member, collar means mounted on said shaft and secured to said second cam member to drive said second cam member, said first cam member connected to power input and the second cam member load connected, a shear pin interconnecting said cam members, each said cam member having a high dwell and a low dwell each of approximately 180 degrees angular duration, said high dwells being side by side and substantially 180 degrees apart relative to each other when said shear pin is intact, a first and second cam follower positioned to engage both said cam members and displaced from each other by about 180 degrees and having a projected and a retracted position, biasing means attached to each said cam follower to urge the cam followers to contact the cam dwell surface, said cam followers being in retracted position when in contact with either of said high dwells, and means connected to said cam followers for interrupting rotation of said drive shaft when said shear pin is severed and said cam members move relative to each other.

3. A cam and cam follower actuating mechanism for shear pin couplings comprising, in combination: a shaft, a first cam rotatably mounted on said shaft, a second cam member fixed to said shaft adjacent said first cam member, a shear pin interconnecting said cam members, said shear pin residing in close fit in a hole in each said cam member outwardly from the cam rotational center and when intact causing said first cam member and shaft to turn together, each said cam member having a high dwell of approximately 180 degrees duration and a low dwell, said high dwells being 180 degrees displaced from each other when said shear pin is intact and in side by side relation, a first and second cam follower positioned to engage both said cam members, each said cam follower about 180 degrees displaced from the other, biasing means attached to each said cam follower to urge the cam followers to contact both said cam members, and means connected to each said cam follower for interrupting rotation of said shaft when said shear pin is severed and said cam members move relative to each other.

References Cited by the Examiner
UNITED STATES PATENTS

| 2,124,965 | 7/1938 | Lind _____ 64—28 |
| 2,297,090 | 9/1942 | Weaver _____ 74—567 |
| 2,568,785 | 9/1951 | Belcher _____ 192—150 |
| 2,665,570 | 1/1954 | Ream _____ 64—28 |
| 2,812,843 | 11/1957 | Hummel _____ 192—150 |
| 2,901,076 | 8/1959 | Dean _____ 318—475 |
| 3,075,332 | 1/1963 | Krupp et al. _____ 53—382 |

BROUGHTON G. DURHAM, *Primary Examiner.*

WESLEY S. RATLIFF, JR., *Assistant Examiner.*